United States Patent
Dahl et al.

(10) Patent No.: US 9,016,638 B2
(45) Date of Patent: Apr. 28, 2015

(54) AIRCRAFT FLAP SYSTEM AND ASSOCIATED METHOD

(71) Applicant: The Boeing Company, Chicago, IL (US)

(72) Inventors: Bruce A. Dahl, Kent, WA (US); Gene A. Quandt, Edgewood, WA (US)

(73) Assignee: The Boeing Company, Chicago, IL (US)

( * ) Notice: Subject to any disclaimer, the term of this patent is extended or adjusted under 35 U.S.C. 154(b) by 163 days.

(21) Appl. No.: 13/623,533

(22) Filed: Sep. 20, 2012

(65) Prior Publication Data

US 2014/0077038 A1    Mar. 20, 2014

(51) Int. Cl.
| | |
|---|---|
| *B64C 9/00* | (2006.01) |
| *B64C 9/20* | (2006.01) |
| *B64C 9/32* | (2006.01) |
| *B64C 9/14* | (2006.01) |

(52) U.S. Cl.
CPC . *B64C 9/20* (2013.01); *B64C 9/323* (2013.01); *B64C 2009/143* (2013.01); *Y02T 50/32* (2013.01)

(58) Field of Classification Search
CPC ............. B64C 9/20; B64C 9/32; B64C 9/323; B64C 2009/143; B64C 9/16; Y02T 50/32; B64D 2045/001
USPC ......... 244/210, 211, 212, 217, 215, 216, 214, 244/213, 99.12, 113, 110 D, 198
See application file for complete search history.

(56) References Cited

U.S. PATENT DOCUMENTS

| | | | | |
|---|---|---|---|---|
| 2,152,835 | A * | 4/1939 | Bolas | 244/217 |
| 2,164,531 | A * | 7/1939 | Lee | 244/113 |
| 2,379,274 | A * | 6/1945 | Boyd | 244/215 |
| 2,635,837 | A | 4/1953 | Grant | |
| 3,260,477 | A * | 7/1966 | Grahame | 244/12.3 |
| 3,837,601 | A | 9/1974 | Cole | |
| 3,884,433 | A * | 5/1975 | Alexander | 244/207 |
| 3,987,983 | A * | 10/1976 | Cole | 244/216 |

(Continued)

FOREIGN PATENT DOCUMENTS

| | | |
|---|---|---|
| DE | 723 748 C | 8/1942 |
| DE | 25 29 441 A1 | 1/1977 |

(Continued)

OTHER PUBLICATIONS

DE 2529441A_English Machine Translation.*

(Continued)

*Primary Examiner* — Tien Dinh
*Assistant Examiner* — Alexander V Giczy
(74) *Attorney, Agent, or Firm* — Alston & Bird LLP

(57) ABSTRACT

An aircraft flap system and an associated method are provided to facilitate ground roll breaking without compromising in-flight performance. The aircraft flap system includes a first flap and a panel pivotally attached to the first flap, such as to a rearward portion of the first flap. The aircraft flap system also includes an actuator configured to controllably position the panel in a stowed position and in a deployed position. In the stowed position, the panel serves as a continuation of the first flap, thereby contributing to the lift provided by the first flap during flight. Conversely, in the deployed position, a panel is articulated relative to the first flap, thereby reducing or eliminating the lift otherwise provided by the flap, following landing of the aircraft.

19 Claims, 4 Drawing Sheets

(56) References Cited

U.S. PATENT DOCUMENTS

| | | | |
|---|---|---|---|
| 4,007,896 A * | 2/1977 | Reynolds, III | 244/215 |
| 4,015,787 A * | 4/1977 | Maieli et al. | 244/215 |
| 5,570,859 A | 11/1996 | Quandt | |
| 5,895,015 A * | 4/1999 | Saiz | 244/215 |
| 6,328,265 B1 * | 12/2001 | Dizdarevic | 244/213 |
| 7,891,611 B2 * | 2/2011 | Huynh et al. | 244/215 |
| 2004/0155157 A1* | 8/2004 | Bray | 244/198 |
| 2005/0061922 A1 | 3/2005 | Milliere | |

FOREIGN PATENT DOCUMENTS

| | | | |
|---|---|---|---|
| GB | 609064 A | | 9/1948 |
| GB | 609064 A | * | 9/1948 |

OTHER PUBLICATIONS

Extended European Search Report for Application No. 13185031.5; dated Jan. 24, 2014.

* cited by examiner

AIRCRAFT FLAP SYSTEM AND ASSOCIATED METHOD

TECHNOLOGICAL FIELD

An example embodiment of the present disclosure relates generally to an aircraft flap system and an associated method and, more particularly, to an aircraft flap system and an associated method that facilitates ground roll breaking without compromising in-flight performance.

BACKGROUND

Aircraft have a number of flaps that are shaped and positioned so as to provide aerodynamic lift during flight. Upon landing, the flaps may continue to provide lift so as to cause the ground roll of an aircraft following landing to be longer than is desired, particularly in instances in which the aircraft is landing at a relatively short airfield. In order to reduce ground roll upon landing of an aircraft, aircraft have included spoilers that decrease the lift provided by the wings and which correspondingly increase the drag on the aircraft. Some aircraft have also incorporated thrust reversers and/or wheel brakes which may be actuated upon landing in order to reduce ground roll and to facilitate, for example, landing at relatively short airfields.

These techniques may increase the complexity of the aircraft design and, while effective at reducing ground roll upon landing, may provide little, if any, performance benefit during flight.

BRIEF SUMMARY

An aircraft flap system and an associated method are provided according to embodiments of the present disclosure in order to facilitate ground roll breaking without compromising in-flight performance. In this regard, the aircraft flap system and associated method of one embodiment include a repositionable panel that may be positioned so as to contribute to the lift provided by a flap during flight and may be repositioned, upon landing, to reduce or eliminate the lift that might otherwise be provided by the flap and to, instead, increase the drag associated with the flap. By providing enhanced ground roll breaking, the aircraft flap system and associated method of an embodiment will provide for improved landing performance, particularly in conjunction with landing on short airfields, but will do so in a manner that does not compromise the in-flight performance of the aircraft.

In one embodiment, an aircraft flap system is provided that includes a first flap and a panel pivotally attached to the first flap, such as to a rearward portion of the first flap. The panel may be linearly mounted to the first flap and, in one embodiment, may be pivotally attached to a rearward portion of the first flap. The aircraft flap system of this embodiment may also include an actuator configured to controllably position the panel in a stowed position and in a deployed position. In the stowed position, the panel serves as a continuation of the first flap, thereby contributing to the lift provided by the first flap during flight. Conversely, in the deployed position, a leading edge of the panel is raised and an opposed trailing edge of the panel is lowered relative to the first flap, thereby reducing or eliminating the lift otherwise provided by the flap, such as following landing of the aircraft.

The aircraft flap system of one embodiment may include an aft flap. In one embodiment, the trailing edge of the panel is in contact with the aft flap in the deployed position. In another embodiment, the trailing edge of the panel has been rotated beyond the aft flap to reach the deployed position. The panel may be linearly mounted to the first flap and, in one embodiment, one or more openings may be defined between the first flap and the panel in the deployed position so as to control the airflow relative to the first flap in such a manner as to reduce or eliminate the lift otherwise provided by the first flap and to increase the drag on the aircraft, such as upon landing.

In another embodiment, an aircraft flap system is provided that includes a first flap having an upper surface and a forward panel pivotally attached to a forward portion of the first flap. The aircraft flap system of this embodiment also includes a forward panel actuator configured to controllably position the forward panel in a stowed position in which the forward panel is a continuation of the first flap and in a deployed position in which a majority of the forward panel is raised relative to the upper surface of the first flap.

The first flap has leading and trailing edges and, in one embodiment, a forward panel is pivotally attached to the first flap at a location closer to the leading edge of the first flap than to the trailing edge of the first flap. In this regard, the forward panel may be pivotally attached to the first flap at a location such that when pivoted the panel acts to spoil the flap increasing drag and decreasing lift.

The aircraft flap system of this embodiment may also include a rearward panel pivotally attached to the first flap, such as a rearward portion of the first flap, and a rearward panel actuator configured to controllably position a rearward panel in a stowed position or, alternatively, a deployed position. In the stowed position, the rearward panel serves as a continuation of the first flap. In the deployed position, a leading edge of the rearward panel is raised and an opposed trailing edge of the rearward panel is lowered relative to the first flap. The aircraft flap system of one embodiment may also include an aft flap. In this regard, the trailing edge of the rearward panel of one embodiment may be in contact with the aft flap in the deployed position. Alternatively, the trailing edge of the rearward panel may have been rotated beyond the aft flap to reach the deployed position in another embodiment. The rearward panel may be linearly mounted to the first flap and, in one embodiment, one or more openings may be defined between the first flap and the rearward panel in the deployed position so as to control the airflow relative to the first flap in such a manner as to reduce the lift otherwise provided by the first flap.

In a further embodiment, a method of controlling airflow with an aircraft flap system is provided that includes positioning a panel that is pivotally attached to a first flap in a stowed position in which the panel serves as a continuation of the first flap. The method of this embodiment also includes repositioning the panel from the stowed position to a deployed position in which a leading edge of the panel is raised and the opposed trailing edge of the panel is lowered relative to the first flap.

In repositioning the panel, the trailing edge of the panel may be in contact with an aft flap while in the deployed position. Alternatively, the panel may be repositioned such that the trailing edge of the panel has been rotated beyond the aft flap to reach the deployed position. In conjunction with the repositioning of the panel, airflow may be directed through one or more openings that are defined between the first flap and the panel while the panel is in the deployed position, thereby reducing the lift otherwise provided by the first flap.

The method of one embodiment may also include controllably positioning a forward panel that is pivotally attached to a forward portion of the first flap between a stowed position and a deployed position. In the stowed position, the forward panel serves as a continuation of the first flap. In the deployed position, a majority of the forward panel is raised relative to the upper surface of the first flap, thereby further reducing lift otherwise provided by the first flap, such as upon landing of the aircraft.

BRIEF DESCRIPTION OF THE DRAWINGS

Figure 1:
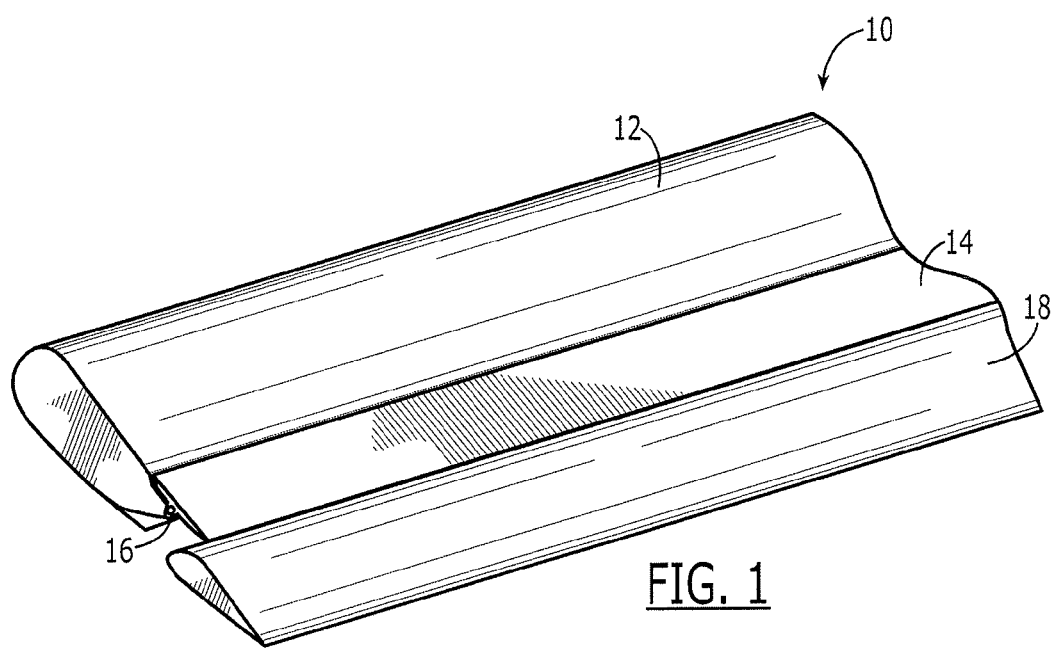
Figure 2:
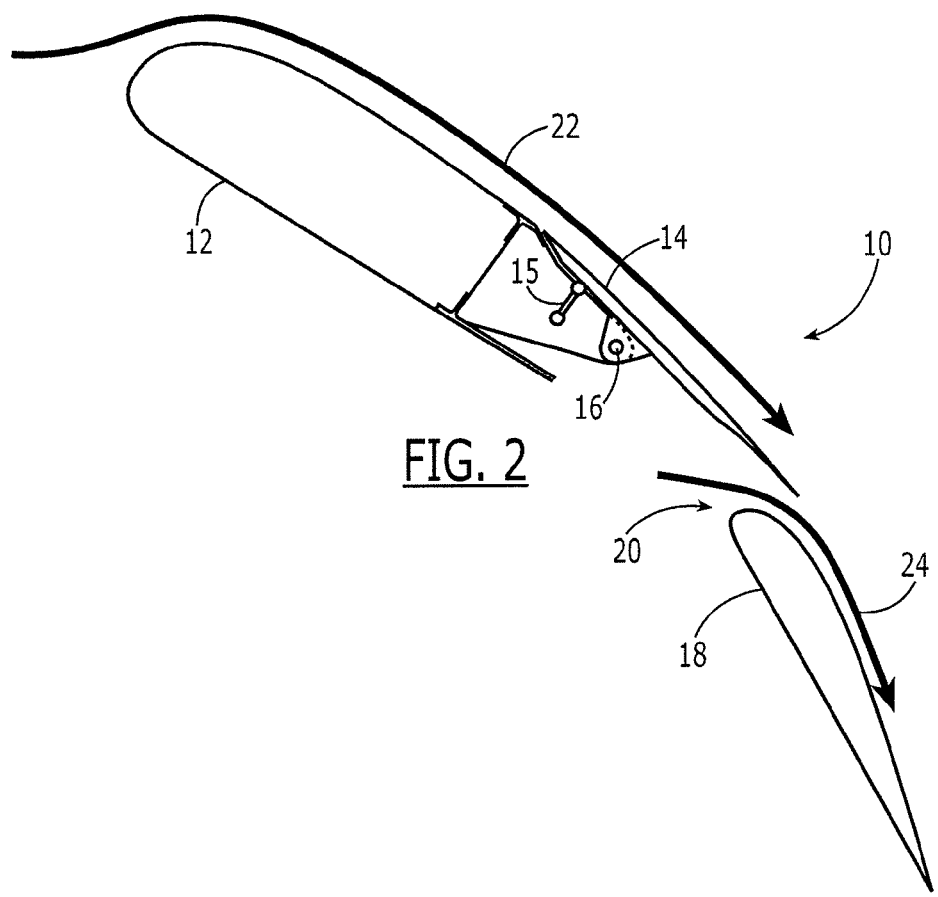
Figure 3:
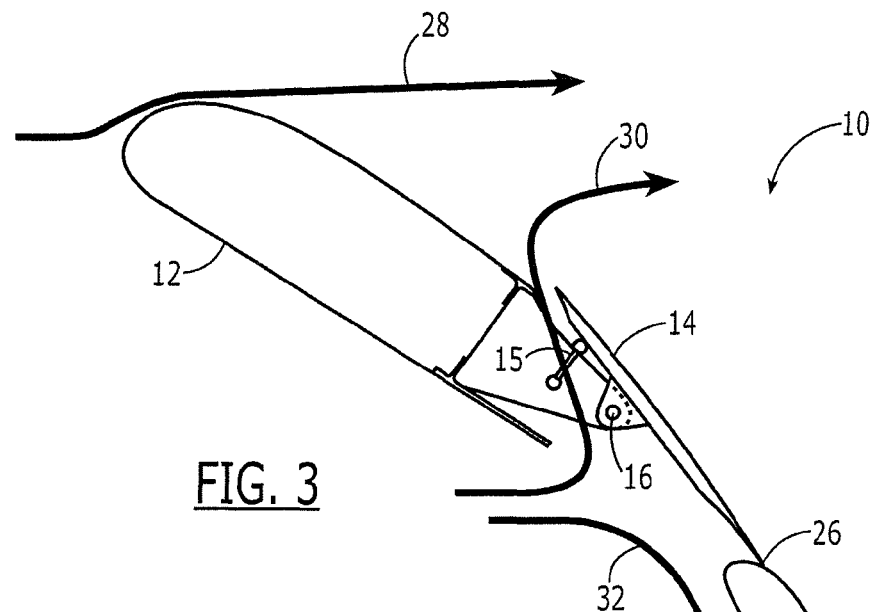
Figure 4:
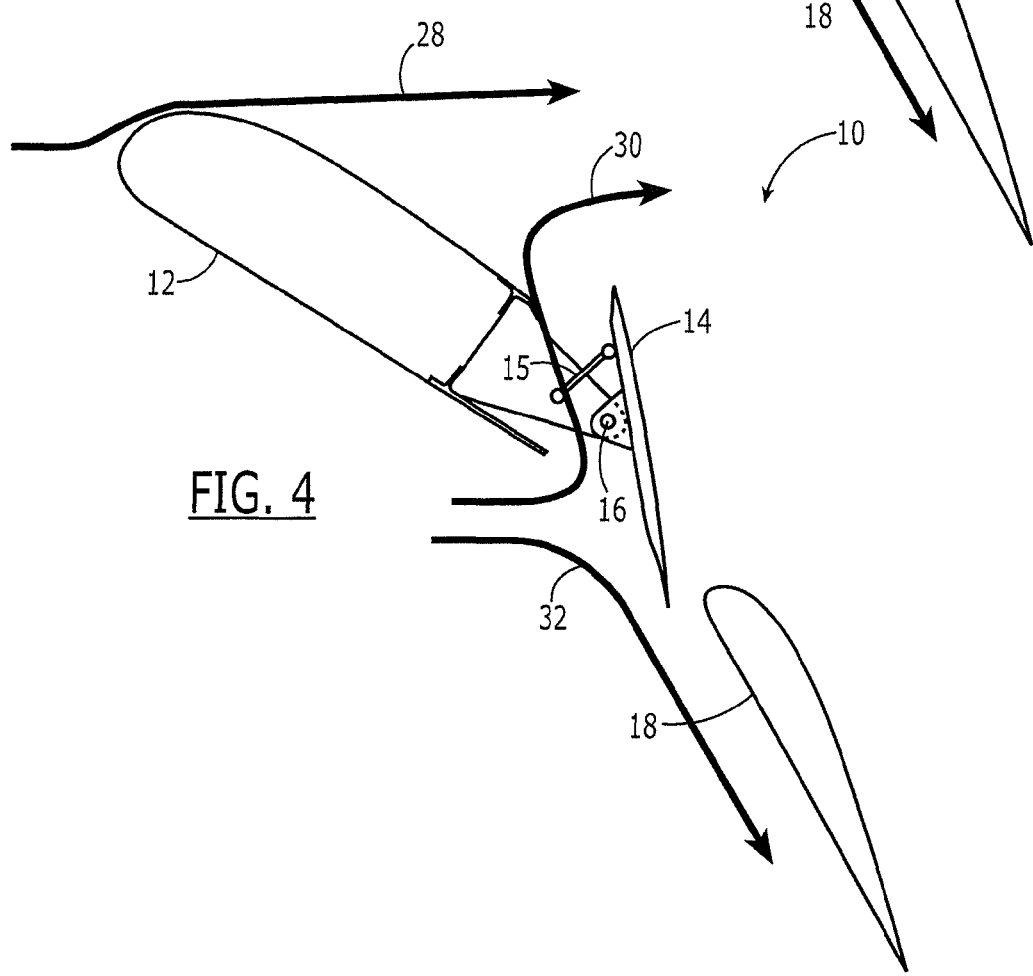
Figure 5:
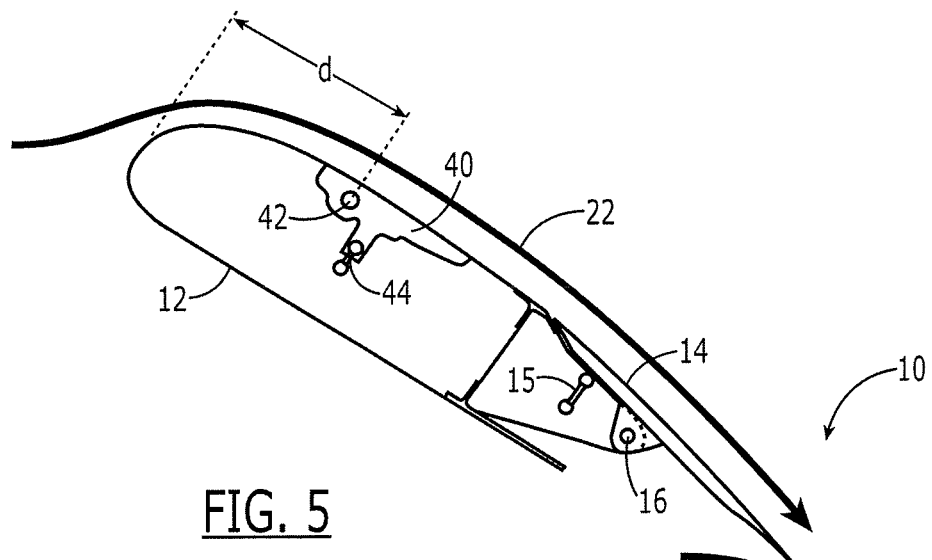
Figure 6:
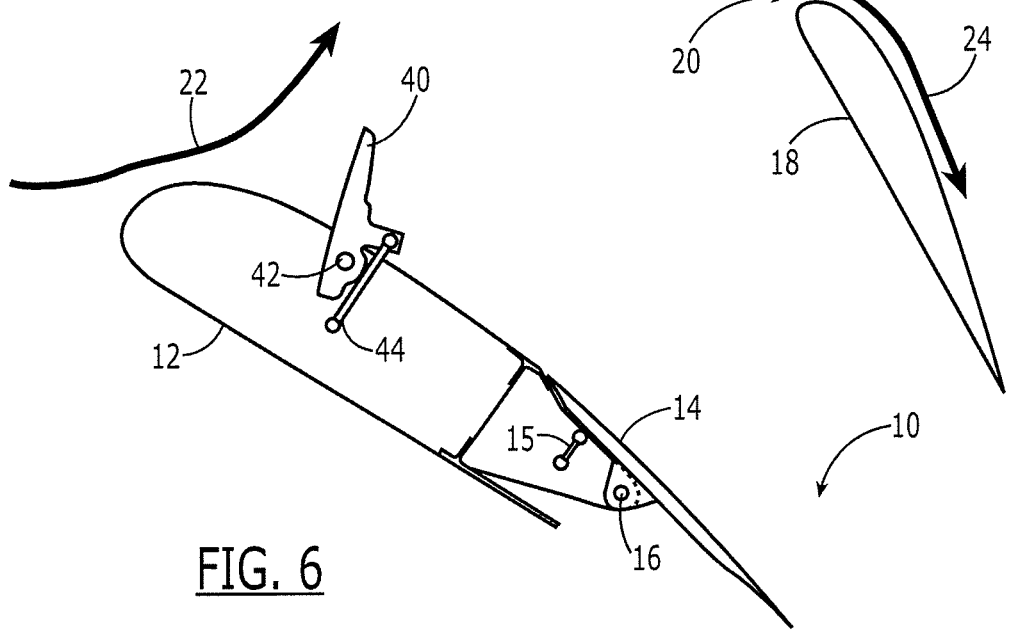
Figure 7:
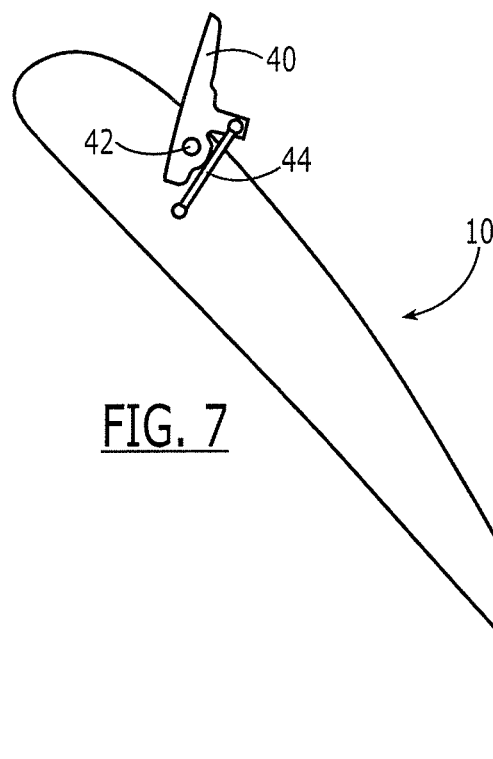
Figure 8:
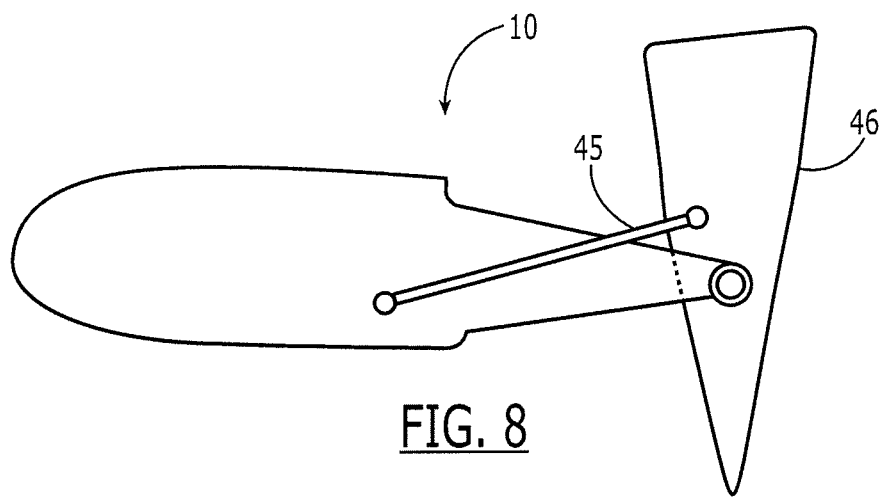

Having thus described certain example embodiments of the present disclosure in general terms, reference will hereinafter be made to the accompanying drawings, which are not necessarily drawn to scale, and wherein:

FIG. 1 is a fragmentary perspective view of an aircraft flap system in accordance with one embodiment of the present disclosure;

FIG. 2 is a side view of an aircraft flap system in accordance with one embodiment of the present disclosure in which the panel is in a stowed position;

FIG. 3 is a side view of an aircraft flap system in accordance with one embodiment of the present disclosure in which the panel is in a deployed position with a trailing edge of the panel being in contact with an aft flap;

FIG. 4 is a side view of an aircraft flap system in accordance with one embodiment of the present disclosure in which the panel is in a deployed position with a trailing edge of the panel having been rotated beyond an aft flap;

FIG. 5 is a side view of an aircraft flap system of another embodiment of the present disclosure that includes both forward and rearward panels pivotally attached to the first flap and shown to be in a stowed position, such as during flight of the aircraft;

FIG. 6 is a side view of the aircraft flap system of FIG. 5 in which the forward panel has been repositioned to the deployed position in order to reduce the lift otherwise provided by the first flap;

FIG. 7 is a side view of an aircraft flap system of another embodiment of the present disclosure including a single flap having a forward panel which is depicted in the deployed position; and FIG. 8 is a side view of an aircraft flap system of another embodiment of the present disclosure including a single flap having a rearward panel which is depicted in the deployed position.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, an aircraft flap system 10 in accordance with an embodiment of the present disclosure is illustrated. Various types of aircraft may include a flap system 10 in accordance with embodiments of the present disclosure. Regardless of the type of aircraft, the aircraft may include a variety of different aerodynamic surfaces with any number of the various aerodynamic surfaces including the aircraft flap system 10 of an example embodiment. In one embodiment, however, the wings of an aircraft may include the aircraft flap system that is described below.

The aircraft flap system 10 may include a first flap 12 and an associated panel 14, such as a rearward panel, that is pivotally attached to the first flap at pivot point 16 and that may be controllably positioned in either a stowed position as shown in FIG. 1 or a deployed position as described below. Although the aircraft flap system 10 of one embodiment may include a single flap as described below, the aircraft flap system of the embodiment of FIG. 1 includes both a first flap 12 and an aft flap 18 positioned rearward of the first flap relative to the direction of flight of the aircraft. The aft flap 18 may be spaced apart from the first flap 12 so as to define a slot there between. Although not shown in FIG. 1, the first flap 12 and the aft flap 18 are structurally connected to one another, such as at a plurality of locations along the length of the aircraft flap system 10.

The panel 14 may be pivotally attached to the first flap 12 at a variety of different locations, but may be attached to a rearward portion of the first flap in one embodiment by being attached to a portion of the first flap, such as at pivot point 16, that is closer to the trailing edge of the first flap than to the leading edge of the first flap. The panel 14 may be pivotally attached to the first flap 12 in various manners, but, in one embodiment, is linearly mounted to the first flap, such as by being pivotally attached to the first flap at a number of locations disposed linearly along the length of the first flap.

The aircraft flap system 10 may also include an actuator, such as a hydraulic actuator, an electromagnetic actuator or other type of actuator, configured to controllably position the panel 14 in a stowed position, such as shown in FIGS. 1 and 2, and a deployed position. In the stowed position, the panel 14 serves as a continuation of the first flap 12, such as a continuation of the upper surface of the first flap, that is, the surface of the first flap that is directed away from the ground. As shown, for example, in FIGS. 1 and 2, the panel 14, in the stowed position, serves to smoothly continue the upper surface of the first flap 12 such that airflow 22 attaches to and is directed over the upper surface of the first flap and the panel in the stowed position. In the embodiment in which the aircraft flap system 10 also includes an aft flap 18, the panel 14, in the stowed position, provides for a slot 20 to be maintained between the trailing edge of the first flap 12 and the leading edge of the aft flap such that airflow 24 may also be directed between the first flap and the aft flap so as to attach to and flow over the upper surface of the aft flap as shown in FIG. 2. By directing the airflow over the upper surfaces of the first flap 12 and, in some embodiments, the aft flap 18, the flaps provide lift for the aircraft. Thus, the actuator of the aircraft flap system 10 may controllably position the panel 14 in the stowed position during takeoff and flight of the aircraft.

Regarding the deployed position of the panel 14, the actuator of the aircraft flap system 10 may controllably position the panel in the deployed position upon or following landing of the aircraft. For example, a sensor may detect that the aircraft has landed by monitoring the weight supported by the wheels of the aircraft and, in an instance in which the sensor detects weight on the wheels above a predefined threshold indicative of the landing of the aircraft, may cause a signal to be provided to the actuator to cause the panel 14 to be repositioned to the deployed position. As shown in FIGS. 3 and 4, the panel 14 may be pivotally attached to the first flap 12 so as to pivot about a pivot point 16 proximate a medial portion of the panel. As such, in the deployed position, the panel 14 has been pivoted relative to the first flap 12 such that the leading edge of the panel is raised and the trailing edge of the panel is lowered relative to the first flap.

In one embodiment depicted in FIG. 3, the first flap 12, the aft flap 18 and the panel 14 pivotally attached to the first flap may be configured such that repositioning of the panel by the actuator to the deployed position causes the trailing edge of the panel to be in contact with the aft flap, such as to be in contact with a leading edge of the aft flap. In another embodiment depicted in FIG. 4, the first flap 12, the aft flap 18 and the panel 14 pivotally attached to the first flap may be configured such that the panel in the deployed position has been pivotally rotated by the actuator such that the trailing edge of the panel has rotated beyond the aft flap.

By having raised the leading edge of the panel 14 relative to the first flap 12, the panel is no longer a continuation of the first flap, such as the upper surface of the first flap, but, instead, extends upwardly above that portion of the upper surface that is adjacent to the panel. Thus, the panel 14 in the deployed position causes the airflow to no longer attach to and smoothly flow over the upper surface of the first flap 12, but to, instead, be separated from the first flap as shown by airflow 28 in FIGS. 3 and 4. Additionally, the movement of the trailing edge of the panel 14 into the slot 20 between the first flap 12 and the aft flap 18 serves to redirect the airflow that otherwise passes through the slot and attaches to and flows over the upper surface of the aft flap. As shown, for example, in FIGS. 3 and 4, the airflow that would otherwise have passed between the first flap 12 and the aft flap 18 may be redirected such that at least a portion of the airflow 32 flows along a lower surface of the aft flap. Additionally, the panel 14 may be pivotally attached to the first flap 12 such that a plurality of openings are defined between the first flap and the panel while in the deployed position. For example, the panel 14 may be pivotally attached to the first flap 12 at a plurality of spaced apart locations along a length of the aircraft flap system 10 with openings defined between those locations at which the panel is pivotally attached to the first flap. As such, another portion of the airflow that otherwise would have passed through the slot 20 between the first flap 12 and the aft flap 18 may be redirected so as to pass through the openings defined between the first flap and the panel 14 while the panel is in the deployed position as shown, for example, by airflow 30 of FIGS. 3 and 4.

By redirecting and separating the airflow from the upper surfaces of the first flap 12 and the aft flap 18, the repositioning of the panel 14 in the deployed position serves to reduce or spoil the lift otherwise provided by the first flap and the aft flap and to increase the drag associated with the aircraft flap system 10. Thus, the panel 14 may be controllably repositioned to the deployed position once the aircraft has landed in order to decrease aircraft ground roll which may facilitate landing of the aircraft on shorter airfields.

In addition to or instead of the rearward panel 14 pivotally attached to a rearward portion of the first flap 12 as described above in conjunction with FIGS. 1-4, the aircraft flap system 10 may include a forward panel 40 as shown, for example, in FIG. 5. In this regard, the forward panel 40 may be pivotally attached to a forward portion of the first flap 12, such as by being pivotally attached to a portion of the first flap at a pivot point 42 that is closer to the leading edge of the first flap than to the trailing edge of the first flap. In one embodiment, the pivot point 42 at which the forward panel 40 is pivotally attached to the first flap 12 is at a location between 0.1 and 0.3 chord lengths of the leading edge of the first flap.

The aircraft flap system 10 of this embodiment also includes a forward panel actuator 44, such as a hydraulic actuator, an electromagnetic actuator or other type of actuator, configured to controllably position the forward panel 40 in a stowed position as shown in FIG. 5 or in a deployed position as shown in FIG. 6. As described above in conjunction with the panel 14 pivotally attached to a rearward portion of the first flap 12, the actuator 44 may be responsive to a control signal provided by a sensor indicative of weight on the wheels of the aircraft, such as following landing of the aircraft, such that the forward panel 40 is moved to the deployed position following landing of the aircraft. Although not shown, the rearward panel 14 may also be repositioned to the deployed position concurrent with the movement of the forward panel 40 to the deployed position following landing of the aircraft.

In the stowed position, such as during takeoff and flight of the aircraft, the forward panel 40 serves as a continuation of the first flap, such as the upper surface of the first flap 12. In this regard, the upper surface of the forward panel 40, the upper surface of the first flap 12 and the upper surface of the rearward panel 14 may define a relatively continuous, smooth surface over which airflow 22 attaches, such as during flight of the aircraft. Once repositioned to the deployed position, such as following landing of the aircraft as indicated by a control signal representative of weight on wheels, a majority of the forward panel 40 is raised relative to the upper surface of the first flap 12. Unlike the panel 14 pivotally attached to the rearward portion of the first flap 12 that pivots about a pivot point 16 located proximate a medial portion of the panel such that both the leading and trailing edges of the panel move appreciably in opposite directions relative to the first flap, the forward panel 40 may be pivotally attached to the first flap at a pivot point 42 proximate a leading edge of the forward panel such that a trailing edge of the forward panel is raised relative to the first flap while the leading edge of the forward panel remains proximate the upper surface of the first flap. As shown in FIG. 6, the repositioning of the forward panel 40 to the deployed position disrupts the airflow over the upper surface of the first flap 12 and causes the airflow 22 to separate from the upper surface of the first flap such that the first flap no longer provides as much, if any, lift for the aircraft.

The forward panel 40 is depicted in FIG. 6 to be in the deployed position and the panel 14 pivotally attached to the rearward portion of the first flap 12 is depicted to be in the stowed position so as to illustrate the independent operation of the forward and rearward panels of the aircraft flap system 10 of one embodiment. However, the forward and rearward panels 40, 14 of the aircraft flap system 10 of another embodiment may be deployed in concert, that is, the forward and rearward panels may be positioned in a stowed position or in a deployed position simultaneous with one another.

Although described above in conjunction with an aircraft flap system 10 having both a first flap 12 and an aft flap 18, the aircraft flap system of another embodiment may include a single flap as shown in FIG. 7. In this embodiment, the single flap may include a forward panel 40 configured to be controllably positioned in a stowed position, such as during flight, and in a deployed position, such as following landing of the aircraft. Although not shown, the single flap may additionally or alternatively include, a rearward panel pivotally attached to a rearward portion of the flap and also controllably positioned in a stowed position and a deployed position, as described above.

Referring now to FIG. 8, an aircraft flap system 10 of another embodiment that has a single flap is depicted. In this embodiment, the single flap may include an aft panel 46 that is configured to be controllably positioned by an actuator 45 in a stowed position, such as during flight, and in a deployed position, such as following landing of the aircraft as shown in FIG. 8. In the stowed position, the aft panel 46 may serve as a continuation of the single flap with the upper and lower surfaces of the aft panel being in alignment with and therefore serving as a continuation of the upper and lower surfaces, respectively, of the single flap. However, in the deployed position as shown in FIG. 8, the aft panel 46 may be rotated relative to the remainder of the single flap with a portion of the aft panel, such as the forward edge of the aft panel, being rotated upwardly relative to the remainder of the single flap and another portion of the aft panel, such as the rearward edge of the aft panel, being rotated downwardly relative to the remainder of the single flap.

By controllably positioning a panel, such as a rearward panel 14 and/or a forward panel 40, relative to a first flap 12 with which the panel is pivotally attached, the aircraft flap system 10 and an associated method of embodiments of the present disclosure facilitate ground roll breaking with the panel(s) in the deployed position without compromising in-flight performance with the panel(s) in the stowed position. In this regard, the repositionable panel(s) may be positioned in the stowed position so as to contribute to the lift provided by the first flap 12 during flight and may be repositioned, upon landing, to the deployed position to reduce or eliminate the lift that might otherwise be provided by the first flap and to, instead, increase the drag associated with the first flap. By providing enhanced ground roll breaking, the aircraft flap system 10 and associated method of an embodiment may provide for improved landing performance, particularly in conjunction with landing on short airfields, but may do so in a manner that does not compromise the in-flight performance of the aircraft.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An aircraft flap system comprising:
   a first flap;
   an aft flap positioned rearward of the first flap;
   a panel pivotally attached to the first flap; and
   an actuator configured to controllably position the panel in a stowed position in which the panel serves as a continuation of the first flap and in a deployed position in which a forward edge of the panel is raised and an opposed rearward edge of the panel is lowered relative to the first and aft flaps,
   wherein the aft flap is configured to remain in a fixed position relative to the first flap while the actuator controllably moves the panel between the stowed and deployed positions relative to both the first and aft flaps,
   wherein the rearward edge of the panel is in contact with the aft flap in the deployed position of the panel, and wherein the rearward edge of the panel is spaced from and out of contact with the aft flap in the stowed position of the panel.

2. An aircraft flap system according to claim 1 wherein one or more openings are defined between the first flap and the panel in the deployed position.

3. An aircraft flap system according to claim 1 wherein the panel is linearly mounted to the first flap.

4. An aircraft flap system according to claim 1 wherein the panel is pivotally attached to a rearward portion of the first flap.

5. An aircraft flap system comprising:
   a first flap;
   an aft flap positioned rearward of the first flap;
   a panel pivotally attached to the first flap; and
   an actuator configured to controllably position the panel in a stowed position in which the panel serves as a continuation of the first flap and in a deployed position in which a forward edge of the panel is raised and an opposed rearward edge of the panel is lowered relative to the first and aft flaps,
   wherein the aft flap is configured to remain in a fixed position relative to the first flap while the actuator controllably moves the panel between the stowed and deployed positions relative to both the first and aft flaps,
   wherein the rearward edge of the panel is on one side of the aft flap in the stowed position of the panel, and wherein the rearward edge of the panel has been rotated beyond a leading edge of the aft flap to reach the deployed position of the panel in which the rearward edge of the panel is on an opposite side of the leading edge of the aft flap.

6. An aircraft flap system according to claim 5 wherein the panel is linearly mounted to the first flap.

7. An aircraft flap system according to claim 5 wherein the panel is pivotally attached to a rearward portion of the first flap.

8. An aircraft flap system comprising:
   a first flap;
   an aft flap positioned rearward of the first flap;
   a forward panel pivotally attached to a forward portion of the first flap;
   a forward panel actuator configured to controllably position the forward panel in a forward panel stowed position in which the forward panel serves as a continuation of the first flap and in a forward panel deployed position in which a majority of the forward panel is raised relative to an upper surface of the first and aft flaps;
   a rearward panel pivotally attached to the first flap; and
   a rearward panel actuator configured to controllably position the rearward panel in a rearward panel stowed position in which the rearward panel serves as a continuation of the first flap and in a rearward panel deployed position in which a forward edge of the rearward panel is raised and an opposed rearward edge of the rearward panel is lowered relative to the first flap,
   wherein the aft flap is configured to remain in a fixed position relative to the first flap while the rearward panel actuator controllably moves the rearward panel between the rearward panel stowed and deployed positions relative to both the first and aft flaps,
   wherein the rearward edge of the rearward panel is in contact with the aft flap in the rearward panel deployed position, and wherein the rearward edge of the rearward panel is spaced from and out of contact with the aft flap in the rearward panel stowed position.

9. An aircraft flap system according to claim 8 wherein the first flap has opposed forward and rearward edges, and wherein the forward panel is pivotally attached to the first flap at a location closer to the forward edge than to the rearward edge.

10. An aircraft flap system according to claim 8 wherein one or more openings are defined between the first flap and the rearward panel in the rearward panel deployed position.

11. An aircraft flap system according to claim 8 wherein the rearward panel is linearly mounted to the first flap.

12. An aircraft flap system comprising:
a first flap;
an aft flap positioned rearward of the first flap;
a forward panel pivotally attached to a forward portion of the first flap;
a forward panel actuator configured to controllably position the forward panel in a forward panel stowed position in which the forward panel serves as a continuation of the first flap and in a forward panel deployed position in which a majority of the forward panel is raised relative to an upper surface of the first and aft flaps;
a rearward panel pivotally attached to the first flap; and
a rearward panel actuator configured to controllably position the rearward panel in a rearward panel stowed position in which the rearward panel serves as a continuation of the first flap and in a rearward panel deployed position in which a forward edge of the rearward panel is raised and an opposed rearward edge of the rearward panel is lowered relative to the first flap,
wherein the aft flap is configured to remain in a fixed position relative to the first flap while the rearward panel actuator controllably moves the rearward panel between the rearward panel stowed and deployed positions relative to both the first and aft flaps, wherein the rearward edge of the rearward panel is on one side of the aft flap in the rearward panel stowed position, and wherein the rearward edge of the rearward panel has been rotated beyond a leading edge of the aft flap to reach the rearward panel deployed position in which the rearward edge of the panel is on an opposite side of the leading edge of the aft flap.

13. An aircraft flap system according to claim 12 wherein the first flap has opposed forward and rearward edges, and wherein the forward panel is pivotally attached to the first flap at a location closer to the forward edge than to the rearward edge.

14. An aircraft flap system according to claim 12 wherein the rearward panel is linearly mounted to the first flap.

15. A method of controlling airflow with an aircraft flap system comprising a first flap and an aft flap positioned rearward of the first flap, the method comprising:
positioning a panel that is pivotally attached to a first flap in a stowed position of the panel in which the panel serves as a continuation of the first flap;
repositioning the panel from the stowed position to a deployed position of the panel in which a forward edge of the panel is raised and an opposed rearward edge of the panel is lowered relative to the first flap and aft flaps; and
maintaining the aft flap in a fixed position relative to the first flap while the panel is repositioned from the stowed position to the deployed position relative to both the first and aft flaps,
wherein repositioning the panel comprises repositioning the panel such that the rearward edge of the panel is in contact with the aft flap in the deployed position of the panel, and wherein the rearward edge of the panel is spaced from and out of contact with the aft flap in the stowed position of the panel.

16. A method according to claim 15 wherein repositioning the panel comprises repositioning the panel such that airflow is directed through one or more openings that are defined between the first flap and the panel in the deployed position.

17. A method according to claim 15 further comprising controllably positioning a forward panel that is pivotally attached to a forward portion of the first flap between a forward panel stowed position in which the forward panel serves as a continuation of the first flap and in a forward panel deployed position in which a majority of the forward panel is raised relative to an upper surface of the first flap.

18. A method of controlling airflow with an aircraft flap system comprising a first flap and an aft flap positioned rearward of the first flap, the method comprising:
positioning a panel that is pivotally attached to a first flap in a stowed position of the panel in which the panel serves as a continuation of the first flap;
repositioning the panel from the stowed position to a deployed position of the panel in which a forward edge of the panel is raised and an opposed rearward edge of the panel is lowered relative to the first and aft flaps; and
maintaining the aft flap in a fixed position relative to the first flap while the panel is repositioned from the stowed position to the deployed position relative to both the first and aft flaps, wherein the rearward edge of the panel is on one side of the aft flap in the stowed position of the panel, and wherein repositioning the panel comprises repositioning the panel such that the rearward edge of the panel has been rotated beyond a leading edge of the aft flap to reach the deployed position of the panel in which the rearward edge of the panel is on an opposite side of the leading edge of the aft flap.

19. A method according to claim 18 further comprising controllably positioning a forward panel that is pivotally attached to a forward portion of the first flap between a forward panel stowed position in which the forward panel serves as a continuation of the first flap and in a forward panel deployed position in which a majority of the forward panel is raised relative to an upper surface of the first flap.

* * * * *